No. 812,345. PATENTED FEB. 13, 1906.
E. HUBER.
TRANSMISSION GEARING.
APPLICATION FILED NOV. 15, 1902.
2 SHEETS—SHEET 1.
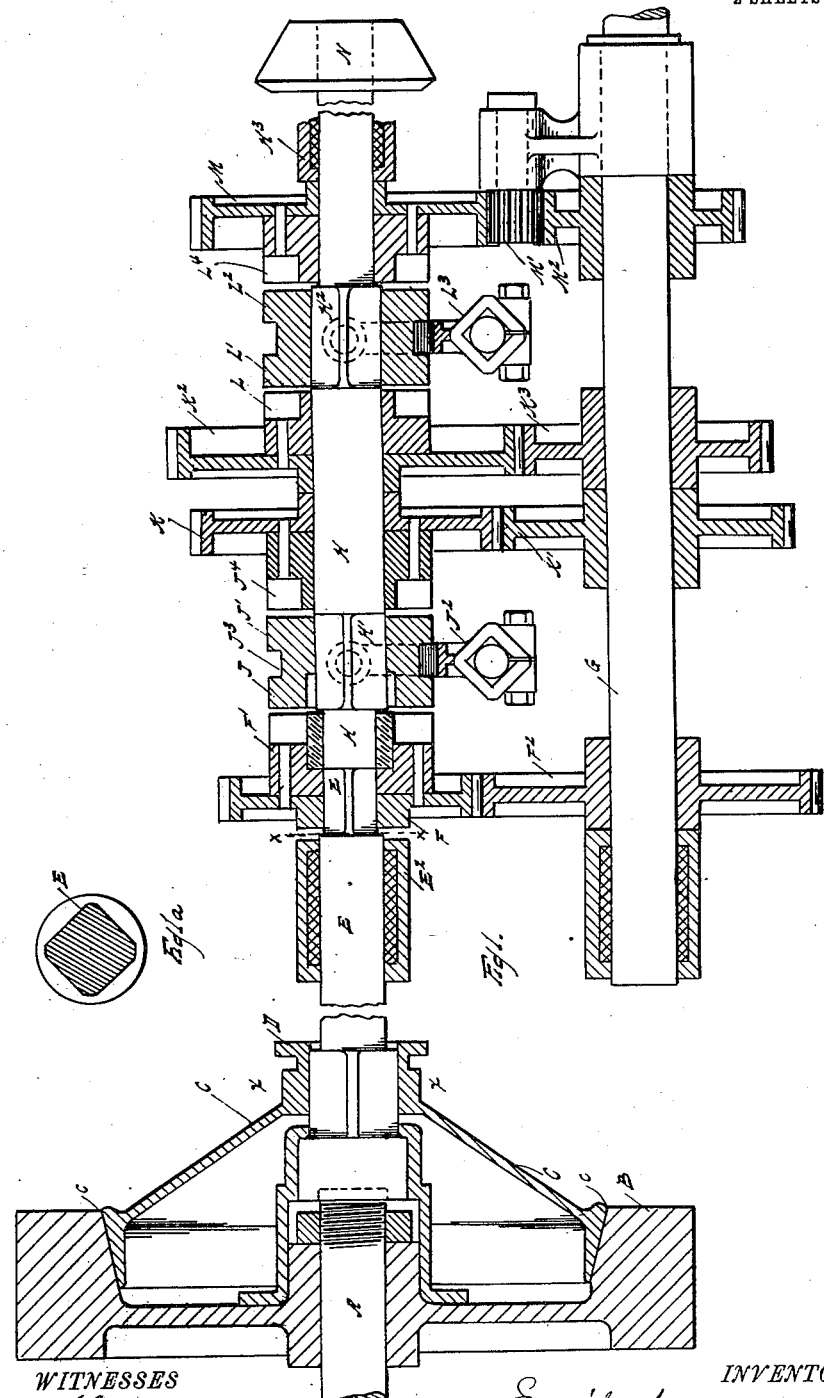
WITNESSES
INVENTOR
Emil Huber
By Parker & Burton
Attorneys.

No. 812,345. PATENTED FEB. 13, 1906.
E. HUBER.
TRANSMISSION GEARING.
APPLICATION FILED NOV. 15, 1902.

2 SHEETS—SHEET 2.

WITNESSES
INVENTOR
Emil Huber
By Parker & Burton
Attorneys.

UNITED STATES PATENT OFFICE.

EMIL HUBER, OF DETROIT, MICHIGAN.

TRANSMISSION-GEARING.

No. 812,345.  Specification of Letters Patent.  Patented Feb. 13, 1906.

Application filed November 15, 1902. Serial No. 131,475.

*To all whom it may concern:*

Be it known that I, EMIL HUBER, a citizen of the United States, residing at Detroit, county of Wayne, State of Michigan, have invented a certain new and useful Improvement in Transmission-Gearing; and I declare the following to be a full, clear, and exact description of the invention, such as will enable others skilled in the art to which it pertains to make and use the same, reference being had to the accompanying drawings, which form a part of this specification.

My invention relates to speed-change or transmission gears and the clutches in use thereon, and has for its object the simplification of such gears, obviating the necessity of shifting the gearing, and thus avoiding the breakages almost necessarily incident thereto, and also to afford a clutch which shall be positively certain to operate, possessing all of the advantages of a squared interlocking clutch and the advantages of an angular clutch; and it consists in the various combinations hereinafter described and claimed.

In the drawings, Figure 1 is a vertical sectional view of change-speed gear so far as the connections therewith to the main shaft are concerned, the shaft, counter-shaft, and gears thereon being drawn in full. Fig. 1ª is a cross-section of the shaft on the line $xx$. Fig. 2 is an elevation of the main shaft and clutches, showing the construction of the clutch. Fig. 3 is a side elevation of one of a pair of clutches with the shaft removed.

Similar letters refer to similar parts.

I have shown only so much as is necessary to illustrate the change-speed gear by itself, it being understood that it is connected to the driving mechanism and supported by proper framing and is adapted to convey power to a counter-shaft, these not being shown, such details forming no part of my invention and being well understood by those skilled in the art, and therefore need no description.

In the drawings, A is the crank-shaft, connected to a source of power, usually an explosive-motor. This is not shown, as it is no part of my invention.

B is the balance-wheel of the usual type and keyed in the usual manner to the shaft A. C is a friction-clutch, also of the usual type and adapted to engage at $c$ with the interior surface of the balance-wheel B. The hub D of the friction-clutch is slidably attached to the shaft E and at a squared portion thereof, (represented in Fig. 1ª,) whereby the driving of the balance-wheel B when the clutch C is engaged therewith will through the medium of its hub D drive the same and compel it to rotate in unison with the shaft A. The clutch C is forced into engagement or withdrawn from the balance-wheel B by an appropriate lever and loose ring, engaging D. This, however, is not shown, because it is a common device, and, in fact, so far the device has nothing new or novel in the arrangement and is only described for the purpose of showing how the shaft E gets its driving power. The shaft E is continued through the bearing $E^2$, which of course is attached to a frame. (Not shown.)

Attached to the shaft E is a spur-pinion F, which constantly rotates with it. This pinion F carries fixed thereto one-half of a form of clutch illustrated in Fig. 2 at F'. The pinion F drives a spur-wheel $F^2$, fixed upon a counter-shaft G, thereby driving the counter-shaft. The shaft E ends with its connection to the pinion F and clutch F'. A secondary shaft H in line with shaft E carries upon a squared portion thereof, H', the opposite half of a double clutch J J', made in one piece and slidably engaging the shaft H on the squared portion H' and controlled in the usual manner by an arm $J^2$, engaging in a circumferential groove $J^3$ between the clutches, whereby the double halves J J' of the clutch may be moved first into engagement with the other half of the clutch F' or out of engagement therewith and allowed to run freely with the shaft H or into engagement with a positively-arranged clutch or half of clutch $J^4$, attached to a spur-wheel K. This spur-wheel K with the half of the clutch $J^4$ revolves freely upon the shaft H, excepting when the half of the clutch J' is connected with $J^4$. Then it must revolve in unison with the shaft H. The spur-pinion K engages with a spur-wheel K' upon the counter-shaft G and driven by it. Another spur-wheel $K^2$ is adapted to run loosely upon the shaft H, and this engages with a smaller spur-wheel $K^3$, also fixed upon the shaft G. The spur-wheel $K^2$ carries one-half of a similarly-constructed clutch L, the companion half to this clutch slidably engaging a squared portion H² on shaft H and also being double, like J J', having the companion halves of clutches L' L² and also being controlled the same as J J' by an appropriate device L³, whereby the clutches L L' can be thrown into engagement with the clutch or clutches L² or into engagement with a corresponding clutch L⁴, attached to another spur-wheel M, which also runs loosely upon the shaft H and engages a spur-pinion M', journaled to the frame carrying the shaft, and this in turn engages a smaller spur-wheel M², fixed to the counter-shaft G. It will be observed that the interposition of the spur-pinion M' would compel a rotation of the spur-wheel M in a contrary direction from that of K² or K, provided the counter-shaft runs in the same direction, as it does not drive K or K². This is the reverse gear. The shaft H is journaled to the main frame at H³ and terminates with a bevel-bear N, which is adapted to drive the bevel-gearing attached to a counter-shaft. (Not shown, as it forms no part of my invention.) These clutches F J J' J⁴ L L' L² L⁴ are shown in elevation in Fig. 2. My peculiar clutches are cut so that each have preferably five spurs, and the necessary and companion parts are all exactly alike. As shown in Fig. 3, there is an interior hollow squared portion P, adapted to slidably engage squared portions of the shaft, as shown at H' H², the face of the clutch divided into ten sections, five of which are spurs and five of which are recesses, the spurs being marked P' and the recesses P². Instead of the spurs being faced on a plane at right angles to the shaft they are each cut at an angle from the apex or extreme projection of the spur back, so that the spur is cut away at the opposite side substantially one-third of its extreme length. This is shown in Fig. 2 on any of the clutches, but, say, at clutch F', which is a type of all, the extreme projection being shown at $f$ and the opposite side of the spur showing one-third of that projection at $f'$. This gives the extreme face of the clutch a slope or an angle, and as the companion clutch, as J, is fashioned exactly in the same way, but in the opposite direction, it will be observed that on bringing the clutches together for the purpose of engagement the slope or angular surfaces $f^2 f^2$ would come in contact with the corresponding surfaces, say, of spur-wheel F and clutch F' in such a direction that it tends to separate the sloping surfaces, thereby facilitating the entrance of the spurs of the clutch into the recesses of the corresponding clutch, and even if it did not slidably engage the clutch farther than the continuation of the angular face $f^2$ of each spur when the clutch had turned sufficiently so that the perpendicular faces engage that engagement would be at least two-thirds of the total length of those faces. At the same time when they are crowded home the backward motion is resisted by the opposite perpendicular faces $f'$ of each clutch, so that they are engaged to the extent of two-thirds of the length of the spurs of the clutches, thereby deriving all the benefit of squared clutches with the benefit of clutches with angular faces. It is well known that clutches with squared faces when brought into engagement are very apt to slip by and the extreme corners catch on the opposite faces, thereby tearing off the corners and in a very short time render the clutch very difficult to throw into engagement when in motion. It will also be observed that in no case are there any gears shifted or shafts shifted longitudinally, so that gears are shifted out of or into engagement, as in the ordinary type of change-speed gears.

The mode of operation is as follows: Assuming that the source of power drives the shaft A and the balance-wheel B by crowding the friction-clutch C into engagement therewith, motion is transmitted to the shaft E and to the spur-pinion F and through it to the spur-wheel F² and counter-shaft G. Motion is also transmitted to the fixed portion F' of one-half of a clutch. The spur-wheel F² being fixed upon the shaft G drives the spur-wheels K', K³, and M², and this in turn drives the spur pinions or wheels K K². The pinion M' and the spur-wheel M all may run loosely upon the shaft H. This would be the condition of things provided the double clutch J J' was held centrally, as shown in the drawings, Fig. 1, it being at that point out of engagement with either one of the clutches F' or J⁴. If, however, it is shifted so that the clutch J engages with F', the shaft H is rotated in unison with the shaft E by virtue of the clutch engaging a squared portion thereof H'. In such position the double clutch L' L² operating upon the squared portion H the shaft H would be held centrally, as shown in the drawings. In such case, therefore, motion would be transmitted directly from the shaft A' through shaft E to shaft H and pinion N, all the other gearing running loosely without transmitting any power. If, however, the double clutch J J' is shifted so as to engage with the clutch J⁴ and disengage from clutch F', then power is transmitted through the pinion F to spur-wheel F², through shaft G, spur-wheel K' to spur-wheel K, and by means of the connection of the clutch J' to J⁴ and a squared portion H' of the shaft H to the shaft H and pinion N. This gives one speed of shaft H and pinion N. If, however, double clutch J J' is held centrally, as shown in the drawings, and allowed to revolve freely with the shaft H and double clutch L' L² is shifted to the half engaging the clutch L, which is fixed to the spur-wheel K², then the power is transmitted from spur-wheel F to spur-wheel F², counter-shaft G, spur-wheel K³, spur-wheel K², and through the clutch L to clutch L' and by means of the squared portion H² to shaft H and to bevel spur-wheel N, giving another or second speed forward through the counter-shaft in addition to the direct speed already described—total, three speeds forward. If, however, double clutch L' L² is connected to the companion half-clutch L⁴, fixed to spur-wheel M, then the power is transmitted from shaft E, through spur-wheel F, to spur-wheel F², shaft G, to spur-wheel M², to pinion M', the spur-wheel M, revolving it in a contrary direction from either K or K², and through the clutches and squared portion H² of shaft H to shaft H and bevel-wheel N, reversing the direction of shaft H from the motion in either of the other cases, and this gives the reverse. Therefore the mechanism, as shown, is adapted for three speeds forward and one speed reverse by simply shifting double clutches J J' and L L² as hereinbefore described and without shifting any of the spur-gearing longitudinally and without engaging or disengaging any such gearing.

Transmission variable-speed gears without shifting gearing are usually operated by friction-clutches and their operation not being positive and depending upon the tightness of the clutches in a short time become unsatisfactory. Operating such a speed-gear by positive clutches is much facilitated by using the particular form of clutches which I have described, and the clutch mechanism is more desirable than the square-toothed form. It is obvious the clutch must hold both ways, and it is also obvious that they must be certain of engagement when thrown in. A clutch with a squared face on each of its spurs would be really worse than the sliding in of gearing, whereby the engaging each other longitudinally, for the reason that under rapid motion it would be impossible for them to slide together to any appreciable extent during the revolution of one and the quiescence of the other half, with the result, as already stated, of abrading or knocking off the corners that did come in engagement, and thus in a very short time spoil the clutch itself; but my form of clutch cutting down the sloping faces of the spurs about one-third of the distance of projection the transverse motion of the clutch throwing it into engagement is continued during a partial revolution, so that it follows longitudinally the slope of the two opposing faces, as one turns and the other does not turn until two-thirds of the face of each spur is engaged, or even more, in case the clutch should slide any more after it passes the opposite projection, and thus a positive direct and strong connection is constantly made when the clutch is shoved home and the engagement completed.

Having thus described my invention, what I desire to claim is—

1. A change-speed gear consisting of a combination of a driving-shaft, a driven shaft, means for connecting and disconnecting said shafts, a spur-wheel and a clutch member fixed upon said driven shaft a counter-shaft, a spur-wheel upon said counter-shaft in constant engagement with the first-mentioned spur-wheel, whereby said counter-shaft is driven, a secondary shaft continuing in line with said driven shaft, a clutch member slidably engaging but rotatably fixed thereon and adapted to engage the clutch member upon the driven shaft, said clutch member being fashioned and engaging substantially as hereinbefore described, whereby the driving-shaft is enabled to drive the driven shaft with the same speed, a spur-wheel normally rotating freely upon said secondary shaft, the clutch member engaging said secondary shaft being made with an opposite clutch-section adapted to engage the spur-wheel normally rotating freely upon said secondary shaft and compelling said spur-wheel to rotate in connection therewith, a spur-wheel engaging said second spur-wheel being fixedly mounted upon said counter-shaft, the whole being so arranged that the double clutch member may be shifted centrally out of engagement with the two opposite clutch members, detaching the secondary shaft from the counter-shaft, or into engagement with the clutch member upon the spur-wheel running loosely upon the secondary shaft whereby the said spur-wheel through the intervention of the gearing upon the counter-shaft will drive said secondary shaft with a speed proportional to the gearing, gear-wheels K² and M normally rotating freely upon said secondary shaft, a second pair of companion clutch members upon the last-mentioned gear-wheels normally rotating freely on the secondary shaft, a second similar pair of clutch members mounted between said companion clutch members and gear-wheels and adapted to engage either one or be adjusted centrally out of engagement with both companion clutch members, gear-wheels on the counter-shaft adapted to engage the last-mentioned gear-wheels and means for shifting the last-named pair of clutch members, substantially as described.

2. The combination of a driven shaft, a gear-wheel and a clutch member fixed on said driven shaft, a counter-shaft, a gear-wheel fixed on said counter-shaft and meshing with the gear-wheel on the driven shaft, a secondary shaft in line with the driven shaft, a gear-wheel K and clutch member J⁴ normally rotatable on said secondary shaft, clutch member adapted to engage the secondary shaft with the driven shaft and to unite the gear-wheel K with the secondary shaft, a gear-wheel K' on the counter-shaft meshing with the gear-wheel K, a gear-wheel $K^2$ normally rotatable on the secondary shaft, a gear-wheel $K^3$ fixed upon the counter-shaft and engaging with the gear-wheel $K^2$, a gear-wheel M on the secondary shaft normally rotatable thereon, a gear-wheel upon the counter-shaft connected with the gear-wheel M, clutch members located between the gear-wheels $K^2$ and M and adapted to connect one or the other of the gear-wheels $K^2$ or M with the secondary shaft.

In testimony whereof I sign this specification in the presence of two witnesses.

EMIL HUBER.

Witnesses:
NETTIE V. BELLES,
R. A. PARKER.